(12) United States Patent
Al-Harbi

(10) Patent No.: US 7,909,687 B2
(45) Date of Patent: Mar. 22, 2011

(54) DEVICE AND METHOD FOR STRIPPING LEAVES FROM HERBS AND PLANTS

(76) Inventor: Abdullah Moraizeeg Al-Harbi, Al-Khobar (SA)

( * ) Notice: Subject to any disclaimer, the term of this patent is extended or adjusted under 35 U.S.C. 154(b) by 77 days.

(21) Appl. No.: 12/483,554

(22) Filed: Jun. 12, 2009

(65) Prior Publication Data

US 2009/0264170 A1   Oct. 22, 2009

(51) Int. Cl.
*A23N 15/10* (2006.01)
(52) U.S. Cl. ........... 460/134; 460/136; 460/137; 56/330
(58) Field of Classification Search .......... 460/134–140; 56/62, 330; 47/1.01 D, 1.01 R, 1.43
See application file for complete search history.

(56) References Cited

U.S. PATENT DOCUMENTS

| | | | | |
|---|---|---|---|---|
| 48,136 | A | * | 6/1865 | Thacher .......................... 56/330 |
| 522,379 | A | * | 7/1894 | Moody ........................... 56/330 |
| 1,170,646 | A | * | 2/1916 | Kreipe ............................ 460/24 |
| 1,772,014 | A | * | 8/1930 | Phillips .......................... 131/323 |
| 5,062,238 | A | * | 11/1991 | Smith et al. ................ 47/1.01 R |

* cited by examiner

*Primary Examiner* — Alicia M Torres
(74) *Attorney, Agent, or Firm* — Strum & Fix LLP

(57) ABSTRACT

A device and method for stripping leaves from the stems of herbs and plants and a method of stripping leaves using the device. The device includes a container that supports a lower plate carrying a number of closely spaced flexible tines. An upper plate is pivotally attached to the lower plate and is movable toward and away from the tines. A scalper blade, that is attached to the upper plate at an angle, moves with the upper plate such that when the upper plate engages the tines the scalper blade is spaced below the tines, and when the upper plate is spaced above the tines the scalper blade is adjacent the tines. The method of stripping leaves from the stems of plants is practiced with the device.

19 Claims, 6 Drawing Sheets

DEVICE AND METHOD FOR STRIPPING LEAVES FROM HERBS AND PLANTS

BACKGROUND OF THE INVENTION

1. Field of the Invention

The present invention relates to the field of kitchen utensils, and more particularly to a device and method for stripping leaves from herbs and plants.

2. Description of Related Art

The use of green leaves of herbs and other similar plants is essential in the preparation of numerous dishes of various styles of cooking. The leaves of herbs and plants such as parsley, basil, coriander, mint, and many others are incorporated into recipes both for health benefits and for the creation of different tastes to bring out the natural flavors of the foods. The leaves are conventionally picked from the stems of the plants by hand which requires a great deal of time and effort. The hand picking procedure demands continuous concentration and often requires more than one person to yield the amount of leaves required for certain recipes. Although there are known devices for cutting and chopping plants for cooking, no devices are known that efficiently strip the leaves from the stems of plants.

As a consequence of the foregoing situation, there has existed a longstanding need for a new and improved device and method for stripping leaves from herbs and plants, and the provision of such a construction and method is a stated object of the present invention.

BRIEF SUMMARY OF THE INVENTION

Briefly stated, the present invention provides a device and method for stripping Leaves from the stems of herbs and plants and a method of stripping leaves using the device. The device includes a container that supports a lower plate carrying a number of closely spaced flexible tines. An upper plate is pivotally attached to the lower plate and is movable toward and away from the tines. A scalper blade, that is attached to the upper plate at an angle, moves with the upper plate such that when the upper plate engages the tines the scalper blade is spaced below the tines, and when the upper plate is spaced above the tines the scalper blade is adjacent the tines. The method of stripping leaves from the stems of plants with the device is practiced by pivoting the upper plate away from the tines and placing the plants so that the leaves are on one side of the tines, and the stems extend between the tines. The upper plate is then pivoted back so it engages the tines and the stems are pulled back away from the tines, thus lodging the leaves between the tines and stripping them from the stems. The upper plate is then raised which causes the scalper blade to move up and dislodge the stripped leaves that then fall into the container.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with drawings, wherein.

DETAILED DESCRIPTION OF THE INVENTION

Figure 1:
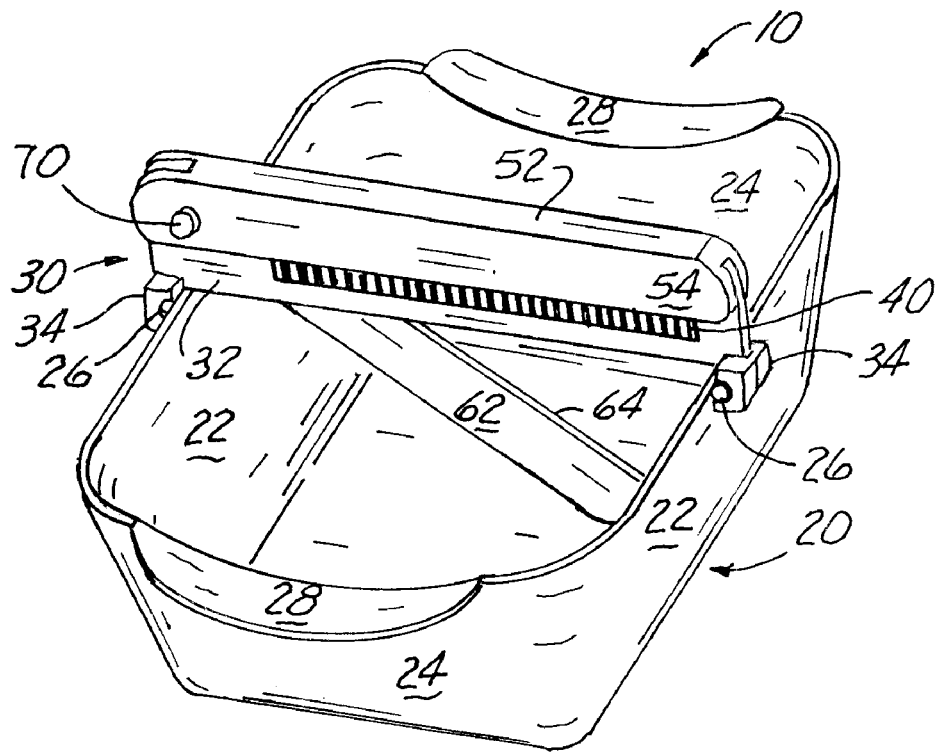
FIG. 1 is a perspective view of the device of the present invention.

As can be seen by reference to the drawings, and in particular to FIG. 1, the leaf stripping device that forms the basis of the present invention is designated generally by the reference to number 10. The leaf stripping device 10 includes a container 20, a lower plate 30 that carries a number of closely spaced tines 40, and an upper plate 50 with an attached scalper blade 60.

Figure 5:
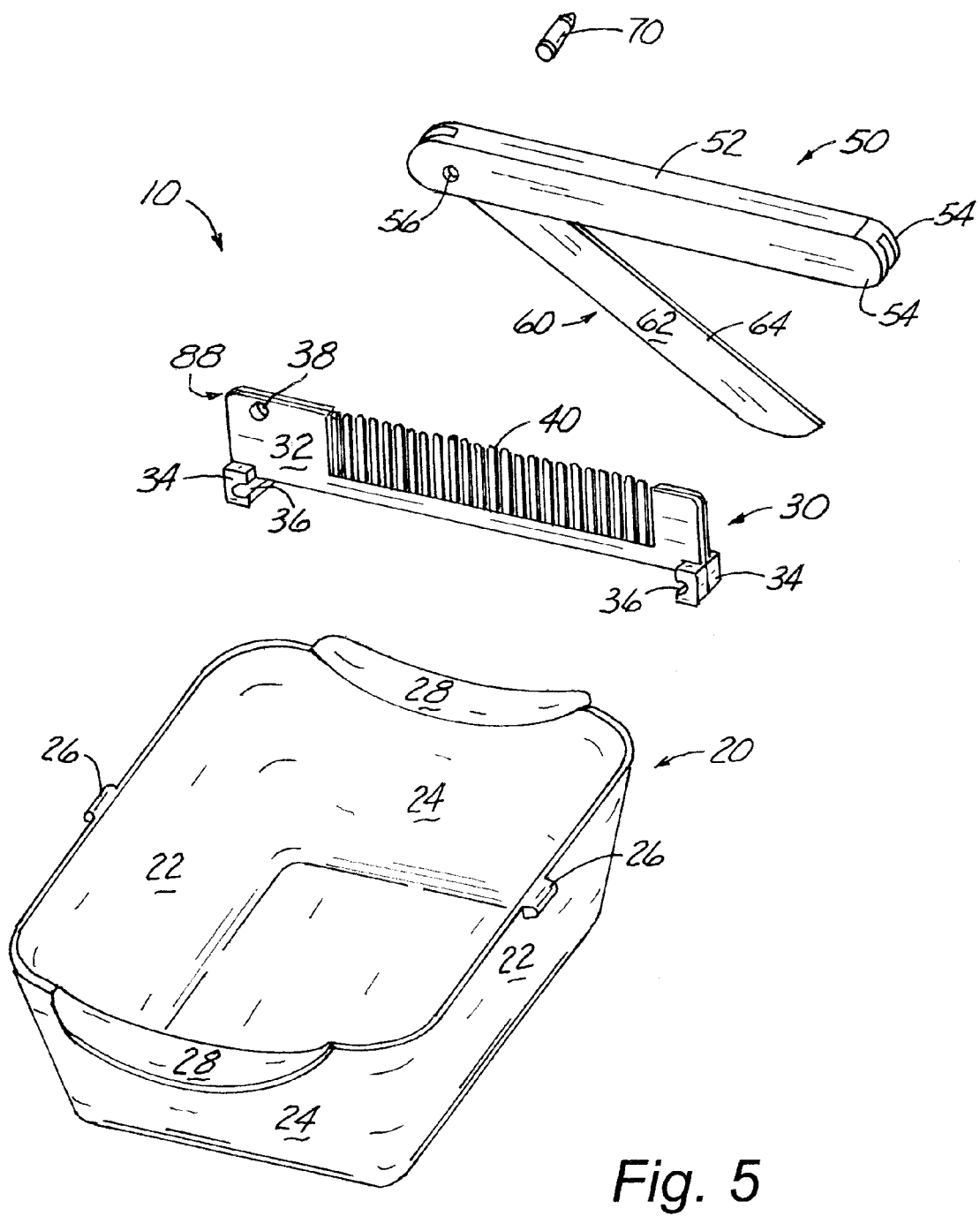
FIG. 5 is an exploded perspective view showing the components of the device.

The container 20 includes opposing side walls 22 and opposing end walls 24, the upper portions of which define an open top. As most clearly shown in FIG. 5, each of the side walls 22 include an outwardly extending tab 26, and each of the end walls 24 include an outwardly directed handle 28.

The lower plate 30 includes a main body portion 32 having brackets 34 with slots 36 disposed at each end. A pivot pin opening 38 is formed through an upper portion of the lower plate 30 at one end, and a chamfered edge 88 is formed on the upper corner at the same end. The central portion of the lower plate 30 carries a number of upwardly directed, closely spaced tines 40 like the teeth of a comb.

The upper plate 50 includes a main body member 52 and a pair of downwardly directed spaced flanges 54. A pivot pin opening 56 is formed through the upper plate 50 at one end. A scalper blade 60 having a body member 62 extends down from the upper plate 50 at an angle. The upper edge 64 of the scalper blade 60 is beveled. The upper plate 50 is pivotally attached to the lower plate 30 by inserting a pivot pin 70 through registered openings 56 and 38, and the lower plate 30 is secured to the container 20 by the mating engagement of the tabs 26 on the container 20 with the slots 36 on the lower plate 30. When the upper plate 50 is pivotally moved to the lowered position, it engages the tines 40 of the lower plate 30, and the two flanges 54 of the upper plate 50 will cover the upper half of the tines 40. The upper plate 50 is stopped to a raised position at an angle above the tines 40 by the chamfered edge 88 on the lower plate 30.

Plants 100, including stems 110 with proximal and distal ends 112 and 114 carrying leaves 120 at the distal ends 114, can be conveniently stripped of their leaves 120 using the device 10 of the present invention.

Figure 6:
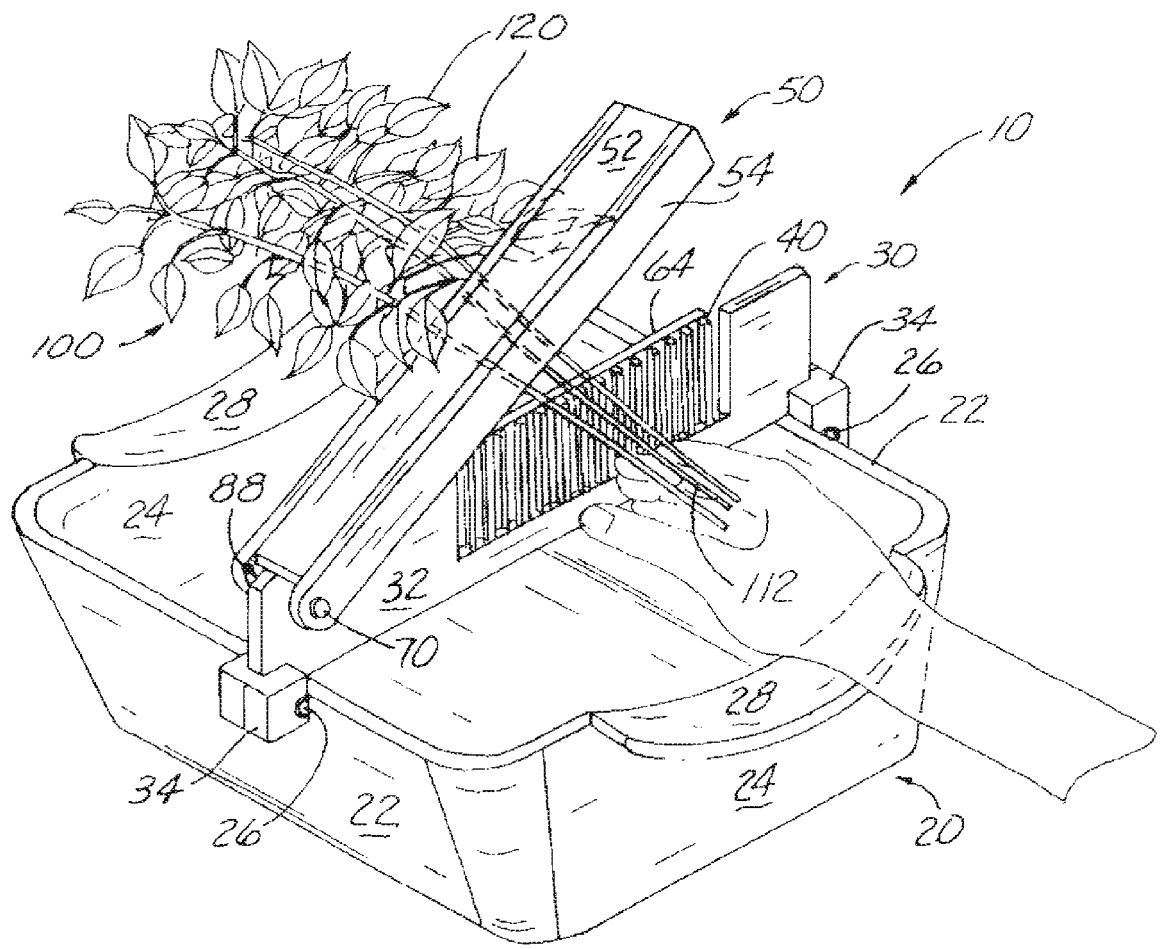
FIGS. 6-8 are perspective views illustrating the method of stripping leaves from herbs and plants using the device of the present invention.
Figure 7:
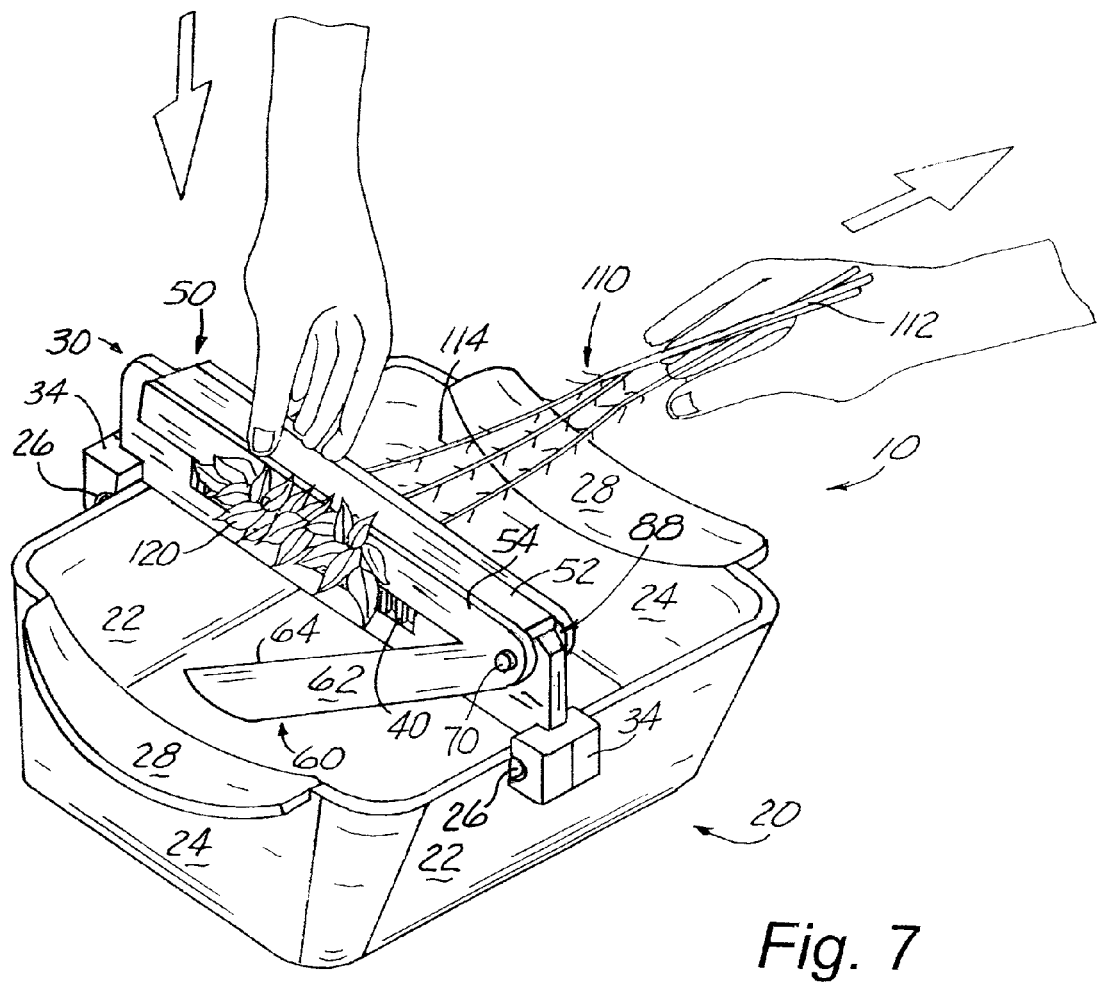
Figure 8:
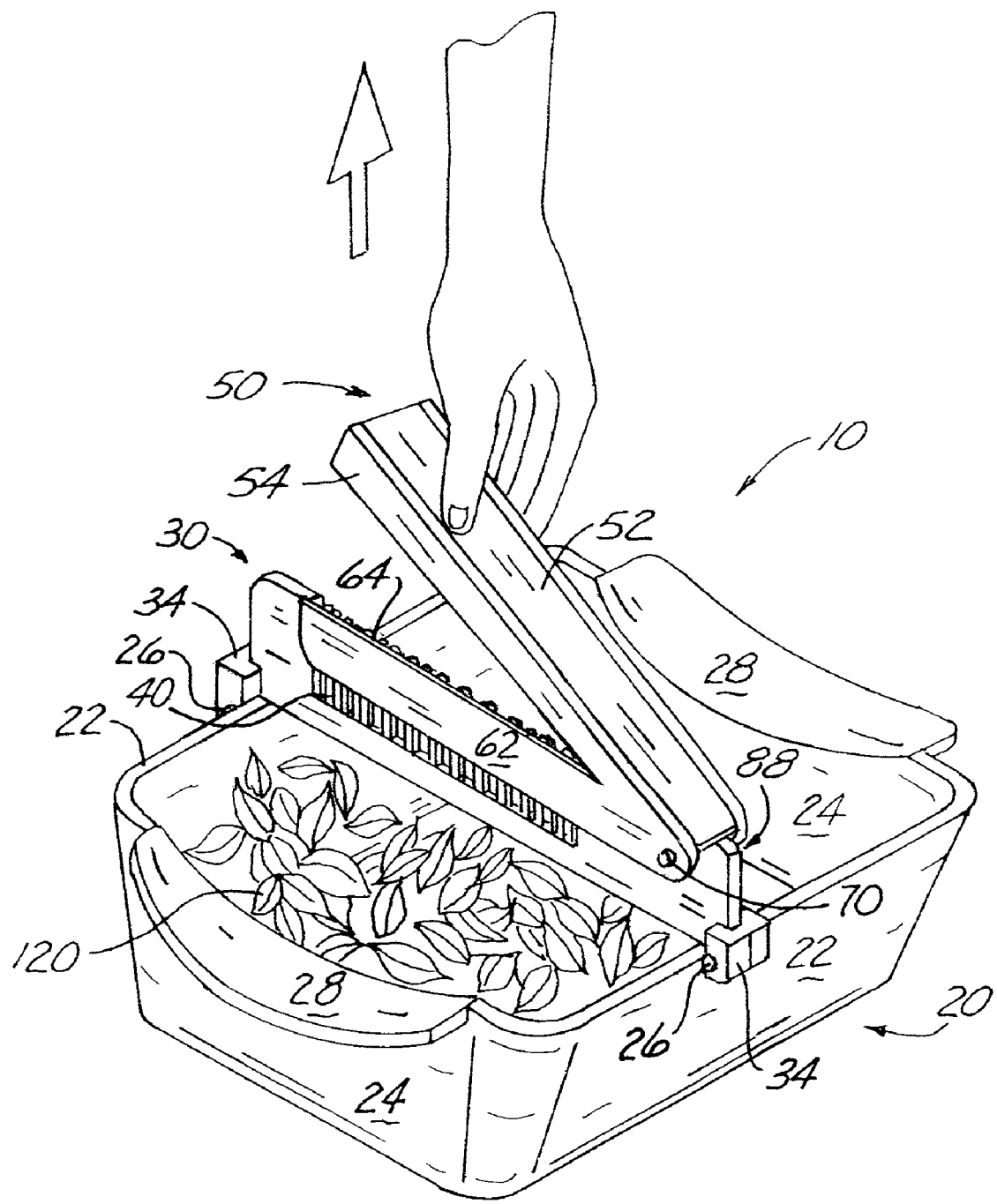

The method of stripping leaves 120 from plants 100 is illustrated in FIGS. 6-8. FIG. 6 shows the upper plate 50 pivoted to a raised position spaced above the tines 40, and plants 100 are positioned between the tines 40. The proximal ends 112 are positioned on one side of the tines 40, and the distal ends 114 carrying the leaves 120 are positioned on the other side. FIG. 7 shows the upper plate 50 moved to the lowered position where it engages the tines 40 with the flange 54 disposed on opposite sides of the tines 40, so these two flanges 54 cover the upper half of the tines 40. As the upper plate 50 is held down, the user simultaneously pulls on the proximal ends 112 of the stems 110 in a direction away from the tines 40 by the help of the flange 54. This strips the leaves 120 from the stems 110 and lodges them between the tines 40. As shown in FIG. 8, the user then moves the upper plate 50 to its raised position. This moves the attached scalper blade 60 from its first position below the tines 40, to its second position adjacent the tines 40 where it engages the lodged leaves 120 and removes them from between the adjacent tines 40, allowing them to fall into the container 20.

Figure 2:
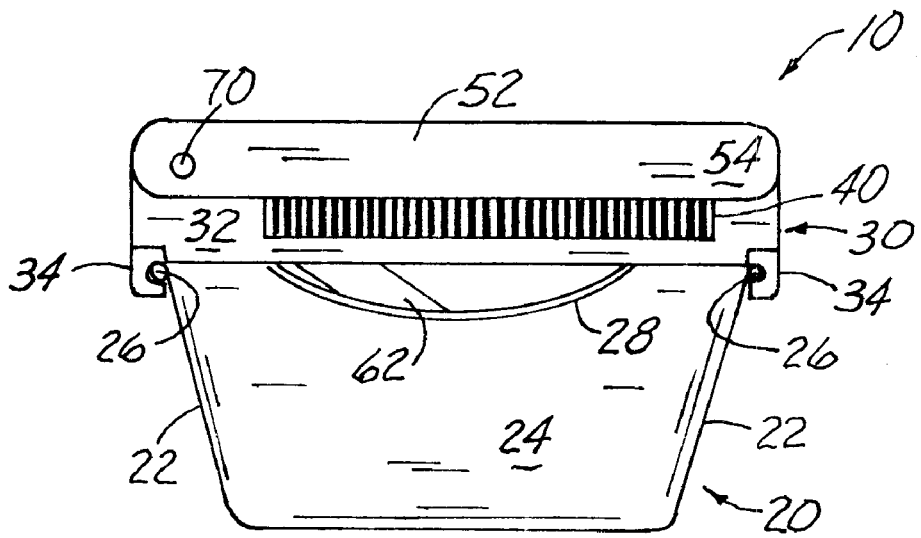
FIG. 2 is an end elevational view thereof.
Figure 3:
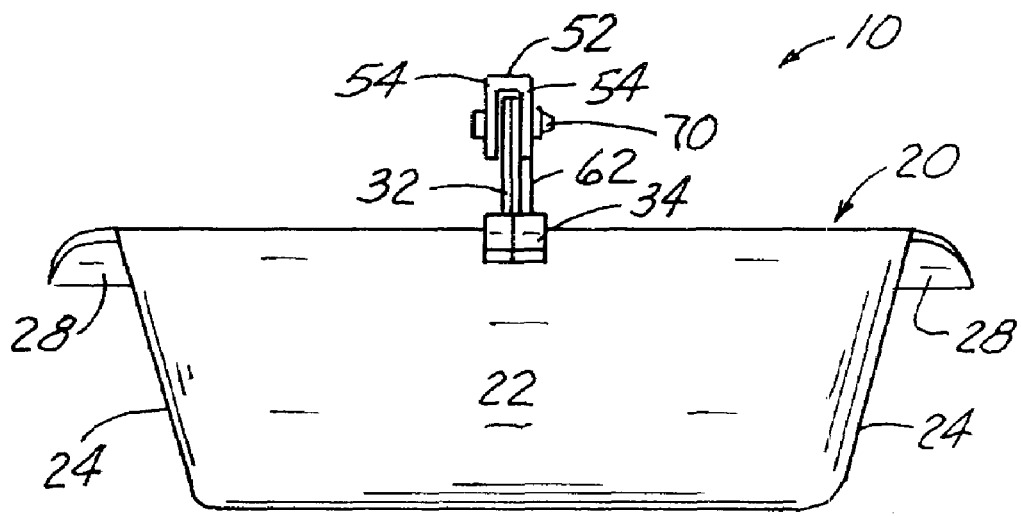
FIG. 3 is a side elevational view thereof.
Figure 4:
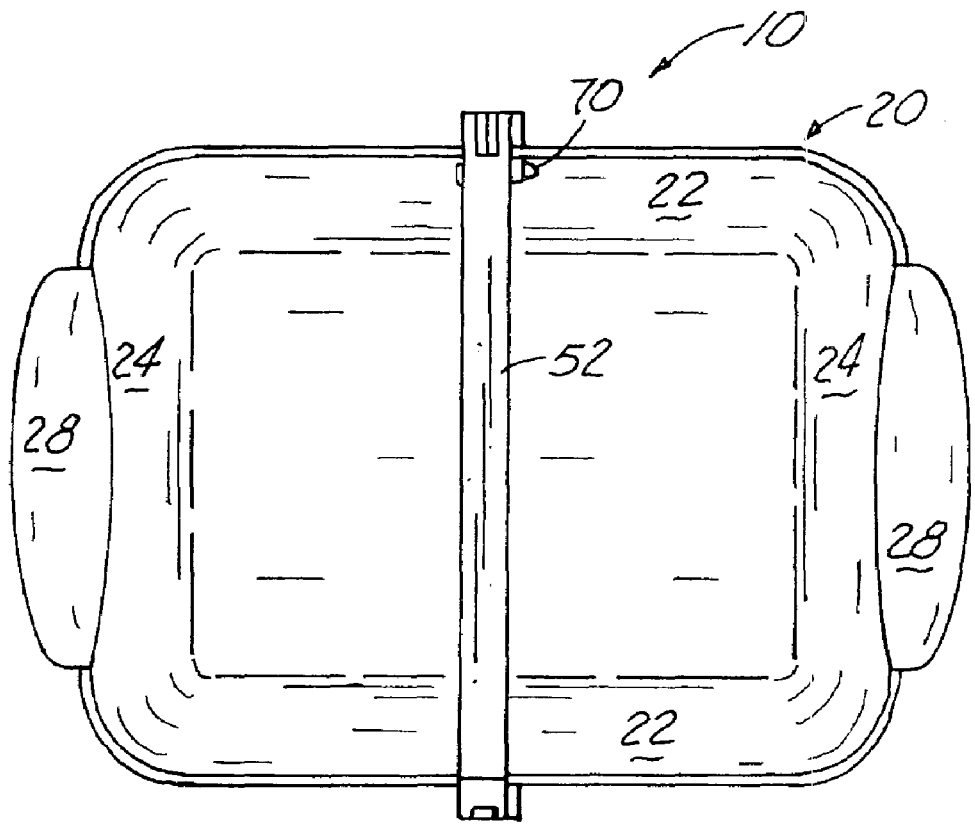
FIG. 4 is a top plan view thereof.

The tines 40 are formed of a flexible material so that the stems 110 of various sized plants 100 can be accommodated between the tines 40 allowing them to flex and hold the stripped leaves 120, and each tine has a round head. Also, as best shown in FIG. 2, the tops of the end walls 24 are curved down to avoid interference with the user's hand as they pull the stems 110 away from the tines 40.

It can be seen that use of the device of the present invention provides a convenient and fast method for removing leaves from the stems of plants. The device may be used by the individual in their household or by food service works in a commercial kitchen. The device is easy and safe to use and can even be operated by children. As illustrated in the drawings, several branches of the plant can be processed in a single operation. Also, the device has an uncomplicated structure with few moving parts that are easy to assemble. Further, the uncomplicated structure facilitates the manufacturing of the device using materials such as plastics.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A device for stripping leaves from herbs and plants, comprising: a container having upwardly directed side walls and end walls, and an open top; an elongated lower plate having ends supported on opposing side walls of the container and being disposed over the open top; a plurality of upwardly directed closely spaced tines carried on a central portion of the lower plate;
   an elongated upper plate pivotally attached at one end to an end of the lower plate, the upper plate being movable between a lowered position engaging the tines, and a raised position spaced above the tines; and
   a scalper blade attached to the one end of the upper plate and being disposed to extend down from the upper plate at an angle, the scalper blade being movable between a first position disposed below the tines of the lower plate when the upper plate is in the lowered position, and a second position disposed adjacent the tines of the lower plate when the upper plate is in the raised position.

2. The device of claim 1, wherein the tines are flexible, shaped like the teeth of a comb, and their heads are round.

3. The device of claim 1, wherein the scalper blade has a beveled upper edge.

4. The device of claim 1, wherein the container includes a handle extending out from each of the end walls, and the top of each end wall and its respective handle are curved down.

5. The device of claim 1, wherein each of the opposing side walls of the container supporting the lower plate include a tab extending therefrom, and wherein the lower plate includes a slot disposed at each of its ends, wherein mating engagement of the tabs within the slots secures the lower plate to the container side walls.

6. The device of claim 1, wherein the lower plate has a chamfered edge on an upper side of one end beside a pivot pin opening, the chamfered edge being used as a stop for the upper plate at the raised position.

7. The device of claim 1, wherein the upper plate includes a pair of downwardly directed spaced flanges, the flanges being disposed adjacent to opposite sides of the tines, and the flanges cover the upper half of the tines when the upper plate is in the lowered position.

8. The device of claim 2, wherein the upper plate includes a pair of downwardly directed spaced flanges, the flanges being disposed adjacent to opposite sides of the tines, and the flanges cover the upper half of the tines when the upper plate is in the lowered position.

9. The device of claim 3, wherein the upper plate includes a pair of downwardly directed spaced flanges, the flanges being disposed adjacent to opposite sides of the tines, and the flanges cover the upper half of the tines when the upper plate is in the lowered position.

10. The device of claim 4, wherein the upper plate includes a pair of downwardly directed spaced flanges, the flanges being disposed adjacent to opposite sides of the tines, and the flanges cover the upper half of the tines when the upper plate is in the lowered position.

11. The device of claim 5, wherein the upper plate includes a pair of downwardly directed spaced flanges, the flanges being disposed adjacent to opposite sides of the tines, and the flanges cover the upper half of the tines when the upper plate is in the lowered position.

12. The device of claim 6, wherein the upper plate includes a pair of downwardly directed spaced flanges, the flanges being disposed adjacent to the opposite sides of the tines, and the flanges cover the upper half of the tines when the upper plate is in the lowered position.

13. A method for stripping leaves from herbs and plants using the device of claim 1, including the steps of: providing a plurality of plants including stems having proximal and distal ends, and leaves attached to the stems adjacent the distal ends;
   moving the upper plate to the raised position;
   positioning the plants between the tines where the leaves are disposed on one side of the tines and the proximal ends of the stems are disposed on another side of the tines; moving the upper plate to the lowered position;
   holding the upper plate in the lowered position and simultaneously pulling the proximal ends of the stems away from the tines thereby lodging the leaves between adjacent tines; and
   moving the upper plate to the raised position thereby moving the scalper blade to its second position to engage and remove the lodged leaves from between the tines and allowing them to fall into the container.

14. The method of claim 13, wherein the tines are flexible, shaped like the teeth of a comb, and their heads are round.

15. The method of claim 14, wherein the scalper blade has a beveled upper edge.

16. The method of claim 15, wherein the container includes a handle extending out from each of the end walls, and the top of each end wall and its respective handle are curved down.

17. The method of claim 16, wherein each of the opposing side walls of the container supporting the lower plate include a tab extending therefrom, and wherein the lower plate includes a slot disposed at each of its ends, wherein the mating engagement of the tabs within the slots secures the lower plate to the container side walls.

18. The method of claim 17, wherein the upper plate includes a pair of downwardly directed spaced flanges, the flanges being disposed adjacent to opposite sides of the tines, and the flanges cover the upper half of the tines when the upper plate is in the lowered position, thus helping the adjacent tines in lodging the leaves.

19. The method of claim 18, wherein the lower plate has a chamfered edge on an upper side of one end beside a pivot pin opening, the chamfered edge being used as a stop for the upper plate at the raised position.

* * * * *